United States Patent Office 3,649,593
Patented Mar. 14, 1972

3,649,593
ORGANIC PHOSPHITES AS STABILIZERS
FOR POLYMERS
Richard H. Kline, Cuyahoga Falls, Ohio, assignor to The
Goodyear Tire & Rubber Company, Akron, Ohio
No Drawing. Filed Feb. 25, 1970, Ser. No. 14,234
Int. Cl. C08c 27/66; C08d 11/04; C08f 45/58
U.S. Cl. 260—45.7 PS                                    11 Claims

ABSTRACT OF THE DISCLOSURE

Polymers subject to oxidative degradation are stabilized by incorporating therein phosphite stabilizers such as tris [4-(methylthio) phenyl] phosphite.

This invention relates to a new class of compounds which has been found to have unusual ability to stabilize polymers. More particualrly, it is directed to a unique class of organic phosphites which is useful in stabilizing oxidizable polymers.

Polymers have proven to be some of the most difficult materials to successfully stabilize against the deleterious effects of oxygen. Both vulcanized and unvulcanized polymers are susceptible to the deleterious effects that are found in normal atmospheric conditions as well as under more severe conditions, and although many materials have been suggested and used as polymer stabilizers, no completely satisfactory material has been found that will fully protect polymers under the widely different conditions to which they are subjected. The search for new and better polymer stabilizers is therefore a problem which continues to command the attention of many skilled investigators.

It is an object of this invention to provide a new class of organic phosphites that is particularly effective in stabilizing oxidizable polymers.

In accordance with the present invention, the foregoing and additional objects can be accomplished by employing as polymer stabilizers organic phosphites having the following structural formula:

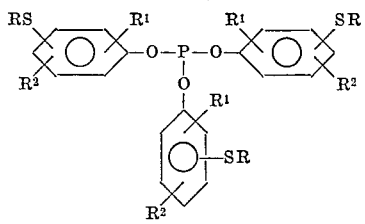

wherein R is selected from the group consisting of alkyl radicals having from 1 to 20 carbon atoms, cycloalkyl radicals having from 6 to 20 carbon atoms, aralkyl radicals having from 7 to 20 carbon atoms, and $R^1$ and $R^2$ are selected from the group consisting of hydrogen, alkyl radicals having from 1 to 20 carbon radicals, cycloalkyl radicals having from 6 to 20 carbon atoms and aralkyl radicals having from 7 to 20 carbon atoms. The R radicals may be the same or different. The same is true for the $R^1$ radicals as well as the $R^2$ radicals. RS, $R^1$ and $R^2$ may be in any position on the phenyl ring, i.e., ortho, meta or para. Preferably the RS radical is in the para or ortho position, most preferably the para position.

Preferably R is an alkyl radical having from 1 to 6 carbon atoms, e.g., methyl and ethyl, and $R^1$ and $R^2$ are selected from the group consisting of hydrogen, alkyl radicals having from 1 to 8 carbon atoms, e.g., methyl, cycloalkyl radicals having from 6 to 10 carbon atoms and aralkyl radicals having from 7 to 12 carbon atoms.

Representative examples of compounds conforming to the above described structural formula are:

tris[4-(methylthio)phenyl]phosphite
tris[4-methylthio)-3-methylphenyl]phosphite
tris[4-(methylthio)-2-methylphenyl]phosphite
tris[4-(ethylthio)phenyl]phosphite
tris[4-(n-dodecylthio)phenyl]phosphite
tris[4-(n-octadecylthio)phenyl]phosphite
tris[4-(n-dodecylthio)-2-methylphenyl]phosphite
tris[4-(n-hexadecylthio)phenyl]phosphite
tris[2-(n-dodecylthio)-4-methylphenyl]phosphite
tris[4-(cyclohexylthio)phenyl]phosphite
tris[4-(cyclohexythio)-2,6-dimethylphenyl]phosphite
tris[4-(methylthio)-2-cyclooctylphenyl]phosphite
tris[2-(methylthio)-4-cyclooctylphenyl]phosphite
tris[2-(methylthio)-4-cyclooctyl-6-methylphenyl]phosphite
tris[4-(methylthio)-2-benzylphenyl]phosphite
tris[4-(methylthio)-2-(1'-phenyl-1'-methylethyl)-phenyl]phosphite
tris[4-(ethylthio)-2-benzylphenyl]phosphite
bis[4-(methylthio)phenyl]4-(methylthio)-3-methylphenyl phosphite
bis[4-(methylthio)-3-methylphenyl] 4-(methylthio) phenyl phosphite
bis[4-(methylthio)-3-methylphenyl] 4-ethylthio)phenyl phosphite
tris[4-(benzylthio)phenyl]phosphite
tris[4-(α-methyl benzylthio)phenyl]phosphite
tris[4-(methylthio)-2,6-dimethylphenyl]phosphite
tris[2-(methylthio)-2,6-dimethylphenyl]phosphite
tris[2-(ethylthio)phenyl]phosphite
tris[4-(methylthio)-2-ethylphenyl]phosphite
tris[2-(methylthio)-4-ethylphenyl]phosphite
tris[2-(methylthio-4-isopropylphenyl]phosphite
tris[4-ethylthio)-2-methylphenyl]phosphite
tris[2-(ethylthio)-4-methylphenyl]phosphite
tris[4-(ethylthio)-3-methylphenyl]phosphite
tris[4-(n-butylthio)phenyl]phosphite
tris[4-(methylthio)-2-cyclohexylphenyl]phosphite
tris[2-(methylthio)-4-cyclohexylphenyl]phosphite
tris[2-(methylthio)-4-(2'-methylcyclohexyl)phenyl]phosphite
tris[2-(ethylthio)-4-cyclohexylphenyl]phosphite
tris[2-(methylthio)-4-(1'-phenylethyl)phenyl]phosphite
tris[4-(methylthio)-2-(1'-phenylethyl)phenyl]phosphite
tris[4-methylthio)-2,6-bis(1'-phenylethyl)phenyl]phosphite
tris[2-(methylthio)-4,6-bis(1'-phenylethylphenyl]phosphite
tris[2-(ethylthio)-4-(1'-phenylethyl)phenyl]phosphite
tris[2-(methylthio)-4-(1'-phenyl-1'-methylethylphenyl] phosphite
tris[4-(n-propylthio)phenyl]phosphite
tris[4-(n-amylthio)phenyl]phosphite
tris[2-(methylthio)-4-tert.butylphenyl]phosphite
tris[2-(methylthio)-4,6-diisopropylphenyl]phosphite
tris[2-(isopropylthio)phenyl]phosphite
tris[2-(methylthio)-4-methyl-6-cyclohexylphenyl]phosphite The organic phosphite stabilizers of the present invention may be made by any method known to the art. However, a preferred process for preparing the organic phosphites consists of reacting at least three moles of an alkyl mercapto substituted phenol with one mole of phosphorous trihalide, preferably phosphorous trichloride. The reaction is carried out under suitable reaction conditions which normally include conducting the reaction in an inert atmosphere such as nitrogen. After all of the reactants have been introduced the reaction is conducted at a reaction temperature which does not substantially exceed 200° C. (preferably between 190° C. and 200° C.) until the evolution of hydrogen halide is complete.

The following examples are presented as illustrations of the preparation of typical organic phosphites of the present invention but they are not to be construed as limiting the scope of the invention.

EXAMPLE 1

A charge of 34.3 grams (0.25 mole) of phosphorous trichloride was added drop-wise at 65° C. to 105 grams (0.75 mole) of 4-(methylthio) phenol. This addition was completed in 20 minutes. The reaction mixture was then heated to 200° C. to drive off hydrogen chloride. The tris[4-(methylthio)phenyl]phosphite was recovered by stripping off the volatile materials under a vacuum to a pot temperature of 200° C./10 mm. of mercury.

EXAMPLE 2

Thirty-four and three-tenths grams (0.25 mole) of phosphorous trichloride were added drop-wise at 65° C. to 115.5 grams (0.75 mole) of 4-methylthio)-3-methylphenyl. The addition was completed in 20 minutes. The reaction mixture was then heated to 200° C. to drive off hydrogen chloride. The tris[4-(methylthio)-3-methyl phenyl] phosphite was recovered by stripping off the volatile materials under vacuum to a pot temperature of 200° C./9 mm. of mercury.

Tris[4-(methylthio) - 2,6 - dimethylphenyl] phosphite could be prepared according to the procedure described in Example 2 by using 2,6-dimethyl-4-(methylthio)-phenol in place of 4-(methylthio)-3-methylphenol in the same molar amount. Also, tris[4-(ethylthio)-2-methylphenyl] phosphite, tris[4-(n-butylthio)phenyl] phosphite, and tris[4-(methylthio)-2-(1'-phenylethyl)phenyl phosphite can be prepared according to the same procedure by using 4-(ethylthio)-o-cresol, 4-(n-butylthio)phenol, and 4-(methylthio)-2-(1'-phenylethyl)phenol respectively.

The polymers that may be conveniently protected by the compounds described herein are oxidizable vulcanized and unvulcanized polymers susceptible to oxygen degradation, such as natural rubber, balata, gutta percha and oxidizable synthetic polymers including those containing carbon to carbon double bonds, such as rubbery diene polymers. Representative examples of the synthetic polymers used in the practice of this invention are polychloroprene; homopolymers of a conjugated 1,3-diene such as isoprene and butadiene, and in particular, polyisoprenes and polybutadienes having essentially all of their repeat units combined in a cis-1,4 structure; copolymers of a conjugated 1,3-diene such as isoprene and butadiene with up to 50 percent by weight of at least one copolymerizable monomer including ethylenically unsaturated monomers such as styrene and acrylonitrile; butyl rubber, which is a polymerization product of a major proportion of a monoolefin and a minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene, ethylidene norbornene and methylene norbornene.

The organic phosphite stabilizers of this invention may be used with or without other stabilizers, vulcanizing agents, accelerators or other compounding ingredients. In order to effectively stabilize polymers, small proportions of one or more of the organic phosphites in accordance with this invention are added to the polymer in a customary antioxidant amount which may vary somewhat depending upon the type and requirements of the polymers to be produced. The compounds of this invention are useful in protecting polymer in any form, for example, polymer in latex form, unvulcanized polymer and vulcanized polymer. The phosphite stabilizers of the present invention, as prior art phosphite type stabilizers, offer insignificant protection to the vulcanized polymer if added to the polymer before vulcanization occurs. Therefore if a vulcanized polymer, that is a polymer vulcanizate, is to be stabilized, the phosphites should be added subsequent to the vulcanization step. This can be done by swelling the vulcanized polymer in a solvent containing dissolved therein the phosphite stabilizer and then subsequently removing the solvent from the swollen vulcanizate, thereby incorporating the phosphite stabilizer therein. With the above qualification the method of addition of the antioxidant to the polymer is not critical. It may be added by any of the conventional means such as by adding to a polymer latex, milling on an open mill or by internal mixing. When the stabilizers of this invention are employed to stabilize the cis-1,4 polyisoprene or cis-1,4 polybutadiene rubbers as described above, a convenient method of incorporation consists of adding the stabilizers to the inert organic solvent in which these polymers are normally prepared after the polymerization of the monomers is essentially complete. Normally from about 0.001 part of about 5.0 parts of the antioxidant by weight based on the weight of the polymer can be used, although the precise amount of these effective stabilizers which is to be employed will depend somewhat on the nature of the polymer and the severity of the deteriorating conditions to which the polymer is to be exposed. In unsaturated polymers such as those made from conjugated dienes, e.g., rubbery butadiene/styrene polymers, the amount of antioxidant necessary is greater than that required by saturated polymers such as polyethylene. It has been found that an effective antioxidant amount of the disclosed stabilizer in polymers will generally range from about 0.05 part to about 5.0 parts by weight or higher based on 100 parts by weight of the polymer although it is commonly preferred to use from about 0.5 part to about 2.0 parts by weight based on 100 parts by weight of the polymer in most instances.

The following examples are intended to illustrate but not to be limiting as to the usage of the phosphite stabilizers of the present invention in oxidizable polymers. Unless otherwise indicated all parts are parts by weight.

EXAMPLE 3

One and twenty-five hundredths parts of the stabilizers shown in the following table were added to 100 parts of antioxidant free styrene-butadiene polymer (SBR-1006, a hot styrene-butadiene rubber) according to the following procedure. The polymer, which was prepared in the form of a latex, was coagulated by the salt-acid process. The polymer was dried in a vacuum oven at a temperature of 50° C. while the oven was flushed with nitrogen. The dried polymer was stored under nitrogen and refrigeration. Portions of the rubber were dissolved in benzene to form a cement containing approximately 3 percent rubber and the indicated stabilizers added thereto. The cements were poured onto aluminum foil so as to form very thin films of rubber when the benzene evaporated. After drying, the weight of the rubber was obtained in connection with each sample. Thereafter the foil with the adhering rubber film was placed in the oxygen absorption apparatus. The oxidation-resistant properties of two triaryl phosphites prepared in accordance with the present invention were compared with the oxidation-resistant properties of a well-known commercially available triaryl phosphite antioxidant. The data obtained are summarized in the following table.

TABLE I

| Sample No. | Antioxidant | Hrs. to absorb 1.0% oxygen (90° C.) |
|---|---|---|
| 1 | Tris(nonylphenyl)phosphite-(Polygard) | 485 |
| 2 | Tris[4-methylthio)-3-methylphenyl] phosphite. | 640 |
| 3 | Tris[4-(methylthio)phenyl] phosphite | 1,025 |

As will be seen from the above data, the two phosphites included within the scope of the present invention were quite superior to the tris(nonylphenyl) phosphite (Polygard), a well-known commercial phosphite stabilizer.

The following example illustrates the protection offered polypropylene by phosphite stabilizers of the present invention.

EXAMPLE 4

Polypropylene samples were prepared in the following manner to contain 0.10 part by weight of stabilizer per 100 parts by weight of polymer. A dilute solution of the stabilizer was prepared (a solvent such as acetone or hexane may be used). The stabilizer solution was added to the polypropylene (Pro-Fax 6501) by dispersing the stabilizer solutions in the powdered polypropylene using a Henschel blender and agitating at 2800 r.p.m. After 15 minutes the typical batch temperature approached 180° F. and a reasonable dispersion of the stabilizers was obtained. After 10 minutes only traces of the solvent remained. The stabilized polypropylene was then injection molded to produce tensile bars, said tensile bars conforming to ASTM–D–638–64T. Some of the tensile bars were aged at 140° C. in a forced air oven for 3 days and 5 days. The stress-strain properties of the original and aged samples were measured by an Instron. A 4½ inch jaw was used, the jaw separation rate being 1 inch per minute. The results are shown in Table II.

TABLE II

| | | Yield tensile (p.s.i.) | | | Tensile retention | | |
| | | | Aged | | | | |
| Sample No. | Antioxidant | Orig. | 3 days | 5 days | Orig. | 3 days | 5 days |
| --- | --- | --- | --- | --- | --- | --- | --- |
| 4 | Tris(nonylphenyl)phosphite-(Polygard). | 5,450 | Failed | Failed | 100 | 0 | 0 |
| 5 | Tris[4-(methylthio)phenyl] phosphite. | 5,250 | 530 | ___do___ | 100 | 10.1 | 0 |
| 6 | Tris[4-(methylthio)-3-methylphenyl] phosphite. | 5,250 | 4,490 | ___do___ | 100 | 95 | 0 |

The above data reveal that two of the stabilizers included within the scope of the present invention, Samples 5 and 6, were superior to a commercial phosphite stabilizer, Sample 4, in polypropylene.

The present invention may be advantageously employed in the manufacture of polymer which is to be used for making a wide variety of articles including tires, tubes, shoes, all types of light-colored rubber articles, hose, coating compositions, etc.

While certain representative embodiments and details have been shown for the purpose of illustrating the invention, it will be apparent to those skilled in this art that various changes and modifications may be made therein without departing from the spirit or scope of the invention.

What is claimed is:

1. A polymer composition comprising a polymer selected from the group consisting of a rubbery diene polymer and a polyurethane containing carbon to carbon double bonds having incorporated therein a composition of matter comprising an organic phosphite having the following structural formula:

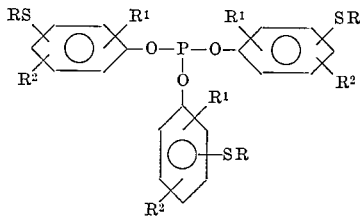

wherein R is selected from the group consisting of alkyl radicals having from 1 to 20 carbon atoms, cycloalkyl radicals having from 6 to 20 carbon atoms and aralkyl radicals having 7 to 20 carbon atoms and wherein $R^1$ and $R^2$ are selected from the group consisting of hydrogen, alkyl radicals having from 1 to 20 carbon atoms, cycloalkyl radicals having from 6 to 20 carbon atoms and aralkyl radicals having from 7 to 20 carbon atoms.

2. The polymer according to claim 1 wherein R is an alkyl radical having from 1 to 6 carbon atoms and $R^1$ and $R^2$ are selected from the group consisting of hydrogen, alkyl radicals having from 1 to 8 carbon atoms, cycloalkyl radicals having from 6 to 10 carbon atoms and aralkyl radicals having from 7 to 12 carbon atoms.

3. The polymer according to claim 2 wherein R is selected from the group consisting of methyl and ethyl.

4. The polymer according to claim 3 wherein the RS radicals are in the para positions.

5. The polymer according to claim 4 wherein $R^1$ and $R^2$ are selected from the group consisting of hydrogen and methyl.

6. The polymer according to claim 1 wherein the organic phosphite is selected from the group consisting of tris[4-(methylthio)phenyl] phosphite
tris[4-(methylthio)-3-methylphenyl] phosphite
tris[4-(methylthio)-2-methylphenyl] phosphite
tris[4-(ethylthio)phenyl] phosphite
tris[4-(n-dodecylthio)phenyl] phosphite
tris[4-(n-octadecylthio)phenyl] phosphite
tris[4-(n-dodecylthio)-2-methylphenyl] phosphite
tris[4-(n-hexadecylthio)phenyl] phosphite
tris[2-(n-dodecylthio)-4-methylphenyl] phosphite
tris[4-(cyclohexylthio)phenyl] phosphite
tris[4-(cyclohexylthio)-2,6-dimethylphenyl] phosphite
tris[4-(methylthio)-2-cyclooctylphenyl] phosphite
tris[2-(methylthio)-4-cyclooctylphenyl] phosphite
tris[2-(methylthio)-4-cyclooctyl-6-methylphenyl] phosphite
tris[4-(methylthio)-2-benzylphenyl] phosphite
tris[4-(methylthio)-3-(1'-phenyl-1'-methylethyl) phenyl] phosphite
tris[4-(ethylthio)-2-benzylphenyl] phosphite
bis[4-(methylthio)phenyl]-4-(methylthio)-3-methylphenyl phosphate
bis[4-(methylthio)-3-methylphenyl] 4-(methylthio) phenyl phosphite
bis[4-(methylthio)-3-methylphenyl] 4-(ethylthio)phenyl phosphite
tris[4-(benzylthio)phenyl] phosphite
tris[4-(α-methyl benzylthio)phenyl] phosphite
tris[4-(methylthio)-2,6-dimethylphenyl] phosphite
tris[2-(methylthio)-4,6-dimethylphenyl] phosphite
tris[2-(ethylthio)phenyl] phosphite
tris[4-(methylthio)-2-ethylphenyl] phosphite
tris[2-(methylthio)-4-ethylphenyl] phosphite
tris[2-(methylthio)-4-isopropylphenyl] phosphite
tris[4-(ethylthio)-2-methylphenyl] phosphite
tris[2-(ethylthio)-4-methylphenyl] phosphite
tris[4-(ethylthio)-3-methylphenyl] phosphite
tris[4-(n-butylthio)phenyl] phosphite
tris[4-(methylthio)-2-cyclohexylphenyl] phosphite
tris[2-(methylthio)-4-cyclohexylphenyl] phosphite
tris[2-(methylthio)-4-(2'-methylcyclohexyl)phenyl] phosphite
tris[2-(ethylthio)-4-cyclohexylphenyl] phosphite tris[2-(methylthio)-4-(1'-phenylethyl)phenyl] phosphite
tris[4-(methylthio)-2-(1'-phenylethyl)phenyl] phosphite
tris[4-(methylthio)-2,6-bis(1'-phenylethyl)phenyl] phosphite
tris[2-(methylthio)-4,6-bis(1'-phenylethyl)phenyl] phosphite
tris[2-(ethylthio)-4-(1'-phenylethyl)phenyl] phosphite
tris[2-(methylthio)-4-(1'-phenyl-1'-methylethyl)phenyl] phosphite
tris[4-(n-propylthio)phenyl] phosphite
tris[4-(n-amylthio)phenyl] phosphite
tris[2-(methylthio)-4-tert.butylphenyl] phosphite
tris[2-(methylthio)-4,6-diisopropylphenyl] phosphite
tris[2-(isopropylthio)phenyl] phosphite, and
tris[2-(methylthio)-4-methyl-6-cyclohexylphenyl] phosphite.

7. The polymer according to claim 6 wherein the organic phosphite is selected from the group consisting of tris[4-(methylthio)phenyl] phosphite and tris[4-(methylthio)-3-methylphenyl] phosphite.

8. The polymer according to claim 1 wherein the polymer is unvulcanized.

9. The polymer according to claim 1 wherein the polymer is vulcanized.

10. The polymer according to claim 1 wherein the polymer is selected from the group consisting of natural rubber, balata, gutta percha and synthetic polymers selected from the group consisting of polychloroprene, homopolymers of a conjugated 1,3-diene, copolymers of a conjugated 1,3-diene with up to 50 percent by weight of at least one copolymerizable monomer, butyl rubber, polyurethanes containing carbon to carbon double bonds and terpolymers of ethylene, propylene and a nonconjugated diene.

11. The polymer according to claim 10 where the copolymerizable monomer is an ethylenically unsaturated monomer.

References Cited

UNITED STATES PATENTS

| | | | |
|---|---|---|---|
| 3,060,121 | 10/1962 | Orloff et al. | 260—45.95 |
| 3,281,360 | 10/1966 | Knapp | 260—45.8 |
| 3,509,242 | 4/1970 | Braus et al. | 260—45.7 |

FOREIGN PATENTS

| | | | |
|---|---|---|---|
| 725,214 | 2/1969 | Belgium | 260—45.7 |

MAURICE J. WELSH, Primary Examiner

V. P. HOKE, Assistant Examiner

U.S. Cl. X.R.

260—799, 814

PO-1050
(5/69)

UNITED STATES PATENT OFFICE
CERTIFICATE OF CORRECTION

Patent No. 3,649,593      Dated March 14, 1972

Inventor(s) Richard H. Kline

It is certified that error appears in the above-identified patent and that said Letters Patent are hereby corrected as shown below:

Col. 2, line 14, "tris[4-(cyclohexythio)-2,6-dimethylphenyl] phosphite" should read --tris[4-(cyclohexylthio)-2,6-dimethylphenyl]phosphite--;

line 32, "tris[2-(methylthio)-2,6-dimethylphenyl] phosphite should read --tris[2-(methylthio)-4,6-dimethylphenyl]phosphite--;

line 36, "tris[2-(methylthio-4-isopropylphenyl]phosphite should read --tris[2-(methylthio)-4-isopropylphenyl]phosphite--;

line 37, "tris[4-ethylthio)-2-methylphenyl]phosphite should read --tris[4-(ethylthio)-2-methylphenyl]phosphite;

line 48, "tris[4-methylthio)-2,6-bis(1'-phenylethyl) phenyl]phosphite" should read --tris[4-(methylthio)-2,6-bis(1'-phenylethyl) phenyl]phosphite--;

line 50, "tris[2-(methylthio)4,6-bis(1'-phenylethylphenyl]phosphite" should read --tris[2-(methylthio)-4,6-bis(phenylethyl)phenyl]phosphite--;

line 53, "tris[2-(methylthio)-4-(1'-phenyl-1'-methylethylphenyl]phosphite" should read --tris[2-methylthio)-4-(1'-phenyl-1'-methylethyl)phenyl]phosphite--.

Col. 3, line 23, "phenyl" should read --phenol--.
Col. 4, line 23, "part of" should read --part to--.
Col. 6, line 50, "tris[4-(methylthio)-3-(1'-phenyl-1'-methylethyl)phenyl]phosphite" should read --tris[4-(methylthio)-2-(1'-phenyl-1'-methylethyl)phenyl]phosphite--;

line 54, "phenyl phosphate" should read --phenyl phosphite--.

Signed and sealed this 29th day of August 1972.

(SEAL)
Attest:

EDWARD M.FLETCHER,JR.
Attesting Officer

ROBERT GOTTSCHALK
Commissioner of Patents